United States Patent [19]

Krüger et al.

[11] Patent Number: 4,709,835

[45] Date of Patent: Dec. 1, 1987

[54] DISPENSER POUCH FOR BEVERAGE SYRUPS AND CONCENTRATES

[75] Inventors: Manfred Krüger, Berlin, Fed. Rep. of Germany; Lawrence S. Mucha, Mableton, Ga.

[73] Assignees: Coca-Cola Company, Atlanta, Ga.; Bosch-Siemens Hausgerate GmbH, Munich, Fed. Rep. of Germany

[21] Appl. No.: 797,661

[22] Filed: Nov. 13, 1985

Related U.S. Application Data

[63] Continuation-in-part of Ser. No. 711,364, Mar. 13, 1985, Pat. No. 4,667,853.

[51] Int. Cl.$^4$ .................. B67B 7/24; B65D 35/00
[52] U.S. Cl. .................................. 222/87; 222/92; 222/541; 222/545; 222/567
[58] Field of Search ................ 222/82, 87, 83, 89, 222/568, 129.3, 541, 92, 80, 81, 91, 567

[56] References Cited

U.S. PATENT DOCUMENTS

| | | | |
|---|---|---|---|
| 4,214,675 | 7/1980 | Schmit | 222/83 |
| 4,257,535 | 3/1981 | Mellett | 222/83 X |
| 4,293,081 | 10/1981 | Kuckens | 222/83 |
| 4,483,464 | 11/1984 | Nomura | 222/83 |
| 4,496,078 | 1/1985 | Nelzow et al. | 222/87 |
| 4,582,223 | 4/1986 | Kobe | 222/541 X |

Primary Examiner—Joseph J. Rolla
Assistant Examiner—Gregory L. Huson
Attorney, Agent, or Firm—Birch, Stewart, Kolasch, & Birch

[57] ABSTRACT

A disposable syrup package for use in a post-mix beverage dispenser including a collapsible bag for containing the syrup; a discharge spout extending from the bag; and a break-away proportioning insert in the spout, which is broken when a dosing valve assembly is attached to the spout. The package structure substantially precludes the refilling and reuse thereof.

9 Claims, 4 Drawing Figures

DISPENSER POUCH FOR BEVERAGE SYRUPS AND CONCENTRATES

BACKGROUND OF THE INVENTION

This application is a continuation-in-part of prior U.S. application Ser. No. 711,364, filed Mar. 13, 1985 now U.S. Pat. No. 4,667,853, by Manfred Kruger, assigned to the same assignees as the present invention.

The present invention relates to a disposable syrup package for use in a post-mix beverage dispenser which is designed to substantially preclude refilling and reuse of the package.

A disposable syrup package with a break-away proportioning insert in the discharge spout thereof is disclosed in parent application Ser. No. 711,364, filed Mar. 13, 1985 to Kruger and now U.S. Pat. No. 4,667,853. As described in that application, it is desirable to provide a package which cannot be refilled with syrup and reused, in order to assure that a good quality beverage is dispensed by the dosing and dispensing equipment designed for operation with the package. In the Kruger package the reuse of the package is substantially precluded by a breakaway proportioning insert in the discharge spout, a portion of which falls into the empty container body when the dosing assembly is removed therefrom. Also in the Kruger package, the container has a rigid plastic body which is blow-molded from plastic. Because of the rigidity of the container, it may be readily fulfilled, although reuse with a compatible dosing assembly is substantially precluded by the breakaway proportioning insert. However, it would be desirable to make even the refilling of the container more difficult to thwart any attempts of re-use, even if unsuccessful. Furthermore, it would be desirable to manufacture the containers at a lower cost in view of the disposable nature thereof.

SUMMARY OF THE INVENTION

Accordingly, it is a primary object of the present invention to provide a disposable syrup package, which is not only difficult to reuse, but which is also difficult to refill, making it unlikely that one would attempt to reuse the package in an improper manner with improper ingredients therein.

It is a further object of the present invention to provide a lower-cost, disposable syrup package for use in a post-mix beverage dispensing apparatus.

The objects of the present invention are fulfilled by providing a disposable syrup package for use in a post-mix beverage dispenser apparatus comprising: a collapsible bag forming a main container body having a discharge opening therein; a discharge spout secured to said discharge opening; and dosing means within said spout operatively associated with a dosing valve assembly for dispensing metered quantities of syrup through the valve assembly, the quantities of the syrup to be dispensed by the dosing means being pre-selected according to the type of syrup to be contained in the collapsible bag, said dosing means having a break-away portion which falls into said collapsible bag when a dosing valve assembly, which has been connected to said spout, is disconnected therefrom.

BRIEF DESCRIPTION OF THE DRAWINGS

The objects of the present invention and the attendant advantages thereof will become more readily apparent by reference to the drawings wherein.

DETAILED DESCRIPTION OF PREFERRED EMBODIMENTS

Figure 1:
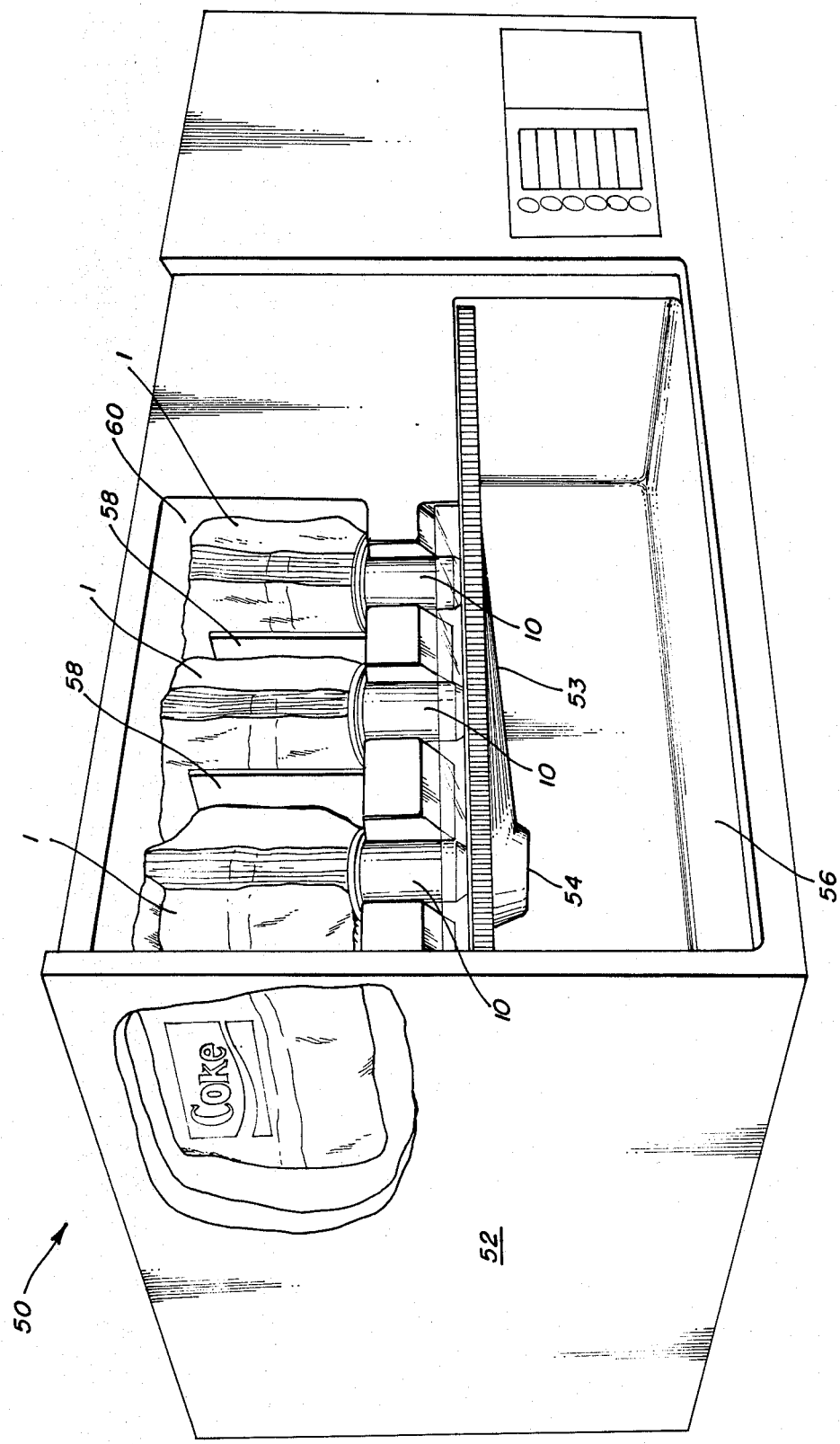
FIG. 1 is a perspective view illustrating a plurality of disposable syrup packages of the present invention operatively disposed in a post-mix beverage dispenser apparatus.

Referring to FIG. 1, there is generally illustrated a post-mix beverage dispenser apparatus 50 including a cabinet 52 with a plurality of disposable syrup packages with collapsible bags 1 disposed therein. The dispenser apparatus and cabinet 50 are preferably of the type disclosed in U.S. Pat. No. 4,496,080, issued Jan. 29, 1985 to Farber, et al., with the addition of dividers 58 in the syrup supply compartment to help support the collapsible bags.

Figure 4:
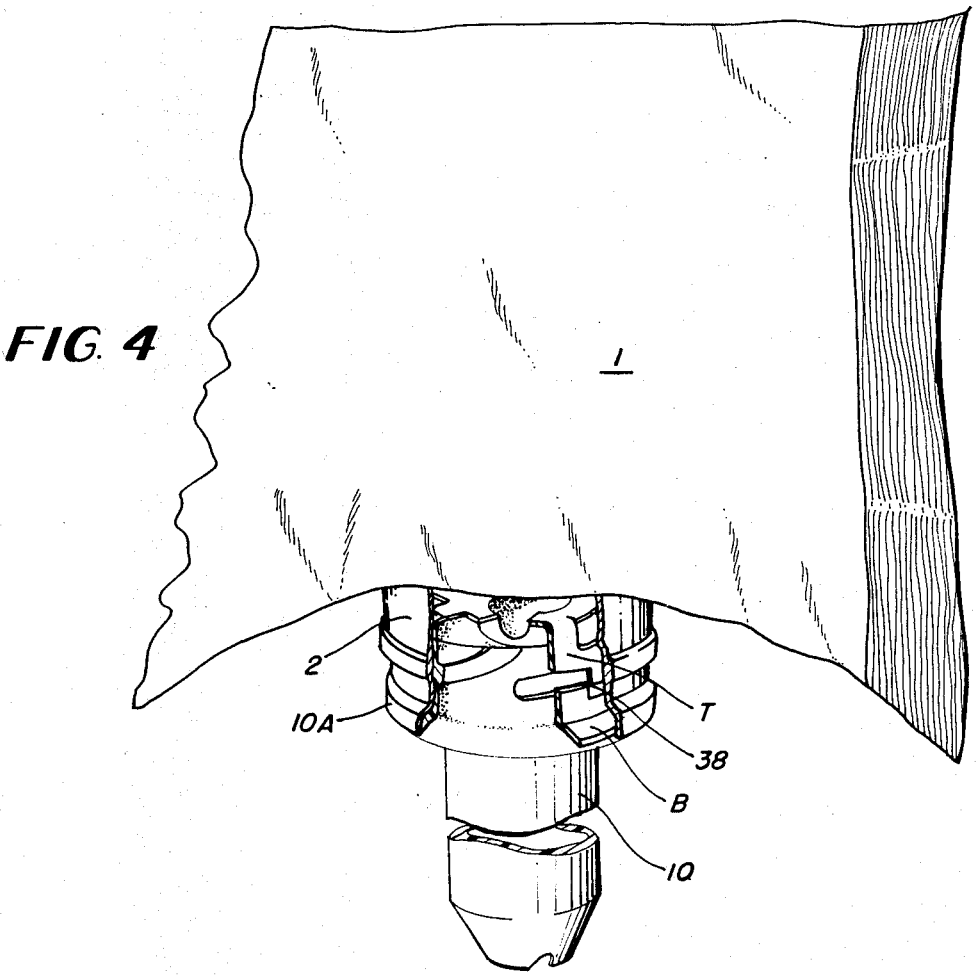
FIG. 4 is a side perspective view of the package of FIG. 2 with a portion of the spout broken away to illustrate the proportioning insert.
Figure 3:
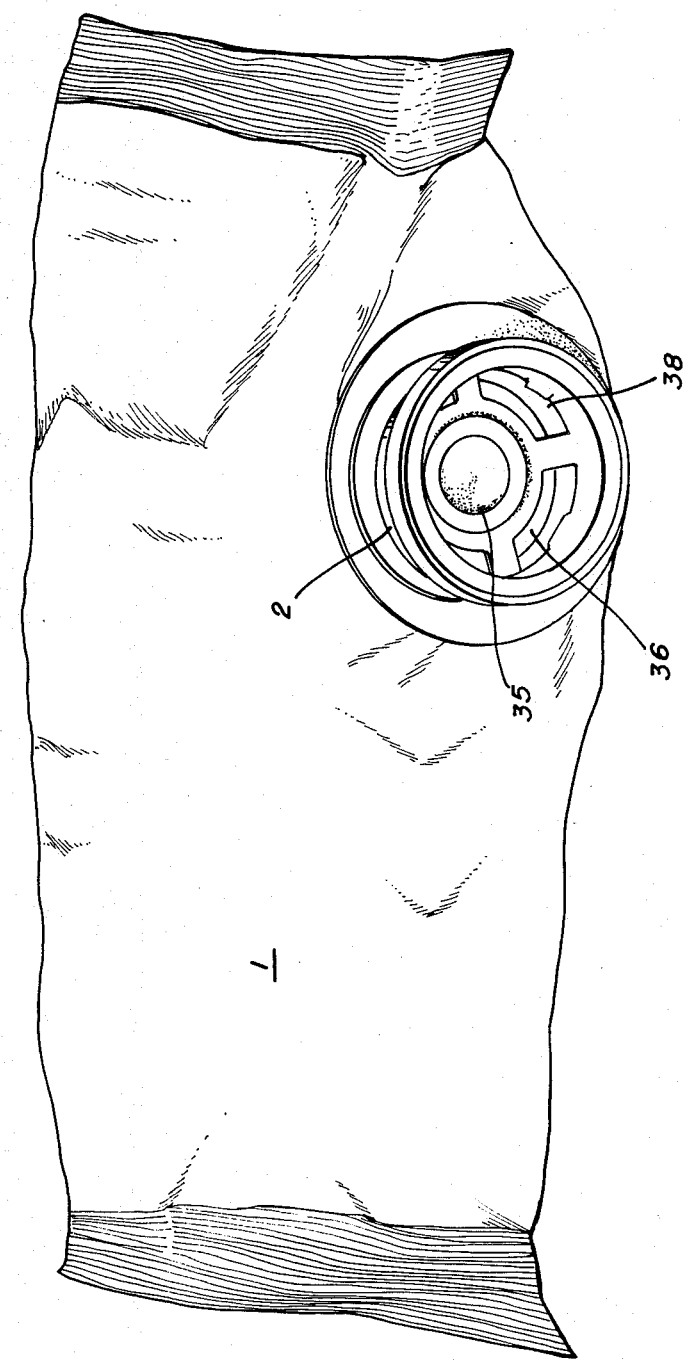
FIG. 3 is a bottom perspective view of the syrup package of FIG. 2, illustrating the proportioning insert in the spout thereof.

The collapsible bags 1 each have a removable dosing valve assembly 10 attached thereto in a manner referred to in more detail with reference to FIGS. 3 and 4. The syrup packages and dosing valve assemblies are operatively disposed in a syrup supply compartment 60 above a mixing trough 53 which is also connected to a source of carbonated water. Syrup from a selected one of the packages is mixed in metered quantities with carbonated water in trough 53, forming a post-mix beverage which is dispensed through a nozzle 54 to a cup disposed at a serving station 56.

Figure 2:
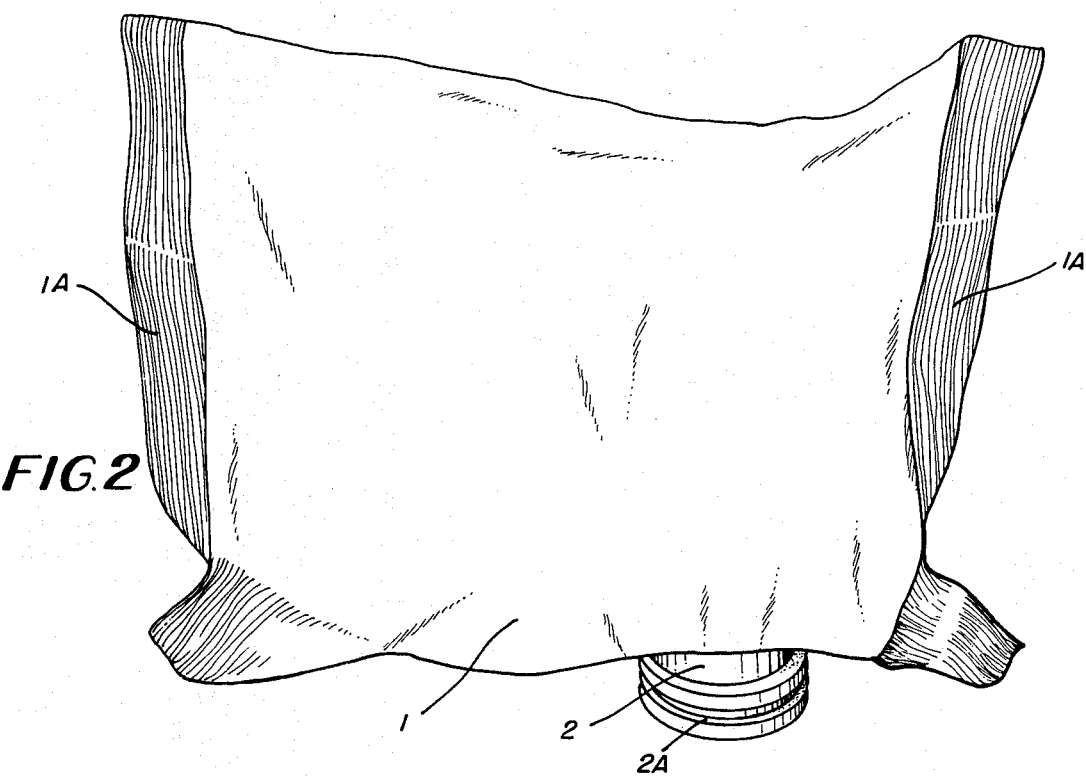
FIG. 2 is a side perspective view of a disposable syrup package of the present invention separated from the dispenser apparatus.

Referring to FIGS. 2 to 4, there is illustrated the disposable syrup package of the present invention including a collapsible bag 1 formed from sheet stock of plastic material, such as polyethylene, with the edges 1A heat sealed together. A discharge spout 2 of a rigid plastic material is secured to a bag opening in a suitable fashion. The spout 2 has threads 2A thereon for engagement with threads on the female socket 10A of a valve dosing assembly 10. Spout 2 also has a proportioning insert secured therein including proportioning dome 35 with fluid passages 36 therethrough and frangible portions 38 normally connecting a top portion T and bottom portion B of the proportioning insert together.

The details of the proportioning insert and dosing valve assembly are more fully described in U.S. patent application Ser. No. 711,364, filed Mar. 13, 1985, now U.S. Pat. No. 4,667,853 the disclosure of which is incorporated herein by reference.

In operation, a disposable syrup package for a selected beverage is selected from a storage location. A dosing valve assembly 10 is screwed into spout 10. When assembly 10 is fully tightened, frangible areas 38 fracture, separating top and bottom sections T and B. The package is then loaded into the dispenser 50 of FIG. 1. When the package becomes empty, it is removed from the cabinet and assembly 10 is unscrewed therefrom. Top T of the proportioning insert, including dome 35 is then free to fall into collapsible bag 1, or it at least becomes non-functional. Futhermore, the empty bag 1 tends to stick together in a wad, making refilling extremely difficult.

The bags 1 and associated spouts 2 could be shipped in multi-paks of a variety of flavors. To use, a selected flavor would be removed from the box and placed into dispenser 50 after attaching a selected dosing assembly 10.

The bags 1 are preferably polyethylene, but could also be multi-layered structures designed to provide oxygen or water barriers.

It should be understood that the package of the present invention could be further modified as would occur to one of ordinary skill in the art without departing from the spirit and scope of the present invention.

What is claimed is:

1. A non-reusable disposable syrup package system wherein contents of a non-reusable disposable syrup package can be dispensed in controlled volumes comprising:
    a dispensing nozzle with valve means for controlling and delivering a predetermined quantity of the contents of the syrup package;
    a collapsible bag having a discharge opening therein;
    a discharge spout secured to said discharge opening;
    a metering element disposed within said spout and having a fluid passage therethrough;
    mounting means substantially permanently attached to said spout of the syrup package;
    web means for releasably connecting said metering element to said mounting means, said web means including preset breaking points;
    connecting means for releasably coupling said metering element to said dispensing nozzle upon connecting said dispensing nozzle to the syrup package,
    said breaking points of said web means being broken, detaching said metering element from said mounting means, after said connecting means is releasably coupled to said metering element upon connecting said dispensing nozzle to the syrup package,
    said metering element being released from said connecting means of said dispensing nozzle and substantially retained within the syrup package upon removing said dispensing nozzle from the syrup package, thereby preventing the reuse of the syrup package as a controlled volume dispensing device.

2. The non-reusable disposable syrup package dispensing system according to claim 1, wherein said connecting means includes at least one snap-stop element on said meterng element and at least one notch in said dispensing nozzle for releasably receiving said at least one snap-stop element on said metering element for releasably attaching said dispensing nozzle to said metering element, whereby said at least one snap-stop element of said metering element is displaced from said notch of said connecting means upon removal of said dispensing nozzle from the syrup package due to said mounting means acting on said metering element and prying it from said connecting means of said dispensing nozzle upon removal of said dispensing nozzle from the fluid package.

3. The non-reusable disposable syrup package dispensing system according to claim 2, wherein said mounting means is a substantially circular ring-shaped flange of a predetermined diameter having a seat-stop on which said dispensing nozzle engages upon connecting said dispensing nozzle to said container,
    said metering element being a substantially circular article of at least the same diameter as said predetermined diameter of said mounting flange,
    said mounting flange preventing the removal of said metering element and acting as a prying means for removal of said metering element from said connecting means of said dispensing nozzle upon removal of said dispensing nozzle from the syrup package, said mounting flange preventing the removal of said metering element from said container due to said metering element being at least the diameter of said mounting flange,
    said dispensing nozzle including a seat-stop that engages with said seat-stop of said mounting flange upon connecting the dispensing nozzle to the syrup package,
    said connecting means including a seat-stop engaging a seat-stop of said metering element upon connecting the dispensing nozzle to the container,
    a distance between said seat-stop of said metering element and the seat-stop of said mounting flange being smaller than the distance between said seat-stop of said dispensing nozzle and said seat-stop of said connecting means of said dispensing nozzle, whereby said seat-stop of said connecting means of said dispensing nozzle engages said seat-stop of said metering element before the engagement of said seat-stop of said dispensing nozzle with said seat-stop of said mounting flange to ensure the dispensing nozzle is connected to the metering element before breakage of the web means and to allow for adequate force to be exerted solely on said web means including said breaking points to substantially easily break said breaking points upon connecting said dispensing nozzle to said container.

4. The non-reusable disposable syrup package dispensing system according to claim 2, wherein said metering element includes at least one screw shoulder,
    said connecting means including a threaded member for releasably receiving said at least one screw shoulder of said metering element for releasably attaching said dispensing nozzle to said metering element, whereby said at least one screw shoulder of said metering element is displaced form said threaded member of said connecting means upon removal of said dispensing nozzle from said container due to said mounting means acting on said metering element to allow said connecting means of said dispensing nozzle to be unscrewed from said at least one screw shoulder of said metering element.

5. The non-reusable disposable syrup package dispensing system according to claim 4, wherein said mounting means is a substantially circular ring-shaped flange of a predetermined diameter having a seat-stop on which said dispensing nozzle engages upon connecting said dispensing nozzle to said container,
    said metering element being essentially a circular article of a least the same diameter as said predetermined diameter of said mounting flange,
    said metering element and said mounting flange defining a one piece unit connected by said web means, said metering element and said mounting flange having corresponding step portions in which a step portion of the metering element is positioned adjacent a space between adjacent step portions of said mounting flange, said web means maintaining a predetermined spaced relationship between said metering member and said mounting flange, said dmetering member being forced into engagement with said mounting flange, destroying said preset breaking points, upon said threaded element of said connecting means engaging said at least one shoulder element upon connecting said dispensing nozzle to the syrup package, said step portions of said metering element and said mounting flange engaging upon unscrewing said dispensing nozzle from said connecting means of said dispensing nozzle preventing the removal of said metering element from the syrup package, said threaded portion of said connecting means having a sufficient length so that a seat-stop of said dispensing nozzle engages with said mounting flange followed by said threaded portin then soley exerting a force due to threading upon said web means including said breaking points to substantially easily destroy said breaking points by further screwing of said threaded portion of said connecting means into said metering element.

6. A non-reuable container coupled with a dispensing nozzle, said container comprising:

a container having an outlet;

a spout connected to said container and positioned at said outlet to which the dispensing nozzle can be releasably connected; and a proportioning insert disposed within said spout and including a fluid passageway therethrough, said proportioning insert comprising:

a first portion secured to said spout;

a second portion with a metering element for metering a flow of liquid from the container in cooperation with said nozzle, said second portion is disposed adjacent said first portion at a position upstream of the direction of flow of liquid from the container relative said first portion, said second portion including a connecting means for providing a releasable coupling for the dispensing nozzle; and a frangible portion connecting said first portion to said second portion;

said second portn is positioned relative to said first portion so that upon connecting the dispensing nozzle to the container, by inserting the dispensing nozzle into the spout, the dispensing nozzle is releasably connected to said second portion and upon further insertion of the dispensing nozzle the second portion releasably connected to the dispensing nozzle is forcibly separated from said first portion causing the breakage of said frangible portion, said first portion is of a predetermined size and shape that upon removal of the dispensing nozzle from the container, it engages with said first portion having a predetermined size and shape that prevents the removal of said second portion due to interference and disconnects said second portion from the dispensing nozzle upon further displacement of the dispensing nozzle out of said spout for complete removal from the container wherein said second portion disassociated from said first portion is substantially retained within said container.

7. The container according to claim 10, wherein said container is a collapsible bag.

8. A non-reusable disposable container system comprising:

a dispensing nozzle with a dosing valve assembly;

a container having an outlet;

a spout connected to said container and positioned at said outlet; and a proportioning insert disposed within said spout and including a fluid passageway therethrough, said proportioning insert comprising:

a first portion secured to said spout;

a second portion with a metering element cooperating with said dosing valve assembly, said second portion is disposed adjacent said first portion at a position upstream of the direction of flow of liquid from the container relative said first portion, said second portion including a connecting means for providing a releasable coupling to said dispensing nozzle; and a frangible portion conecting sid first portion to said second portion, said second portion is positioned relative to said first portion so that upon connecting the dispensing nozzle to the container, by inserting the dispensing nozzle into the spout, the dispensing nozzle is releasably connected to said second portion and upon further insertion of the dispensing nozzle the second portion releasably connected to the dispensing nozzle is forcibly separated from said first portion causing the breakage of said frangible portion, said first portion is of a predetermined size and shape that upon removal of the dispensing nozzle from the container, it engages with said first portion having a predetermined size and shape that prevents the removal of said second portion due to interferance and disconnects said second portion from the dispensing nozzle upon further displacement of the dispensing nozzle out of said spout for complete removal from the container wherein said second portion disassociated from said first portion is substantially retained within said container.

9. The container according to claim 8, wherein said container is a collapsible bag.

* * * * *